(12) United States Patent
Kirkpatrick (10) Patent No.: US 9,587,691 B2
(45) Date of Patent: Mar. 7, 2017

(54) FRICTION DISKS WITH FLOATING WEAR LININGS

(71) Applicant: Goodrich Corporation, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 74 days.

(21) Appl. No.: 14/606,511

(22) Filed: Jan. 27, 2015

(65) Prior Publication Data

US 2016/0215838 A1 Jul. 28, 2016

(51) Int. Cl.
| | |
|---|---|
| *F16D 65/12* | (2006.01) |
| *F16D 55/24* | (2006.01) |
| *F16D 55/40* | (2006.01) |
| *F16D 69/04* | (2006.01) |
| *F16D 55/00* | (2006.01) |
| *F16D 65/02* | (2006.01) |

(52) U.S. Cl.
CPC ........... *F16D 65/127* (2013.01); *F16D 55/24* (2013.01); *F16D 55/40* (2013.01); *F16D 65/122* (2013.01); *F16D 65/126* (2013.01); *F16D 69/0408* (2013.01); *F16D 2055/0058* (2013.01); *F16D 2055/0095* (2013.01); *F16D 2065/132* (2013.01); *F16D 2069/0441* (2013.01); *F16D 2200/0052* (2013.01)

(58) Field of Classification Search
CPC .......... F16D 55/24; F16D 55/28; F16D 55/30; F16D 55/32; F16D 55/36; F16D 55/38; F16D 55/40; F16D 55/44; F16D 65/127; F16D 65/123; F16D 65/124

USPC ................. 188/71.5, 218 XL, 250 B, 250 G
See application file for complete search history.

(56) References Cited

U.S. PATENT DOCUMENTS

| | | | | |
|---|---|---|---|---|
| 3,295,641 A | * | 1/1967 | Eaton | F16D 65/124 188/218 XL |
| 4,018,311 A | * | 4/1977 | Tickle | F16D 65/124 188/218 XL |
| 4,613,021 A | * | 9/1986 | Lacombe | F16D 65/122 188/218 XL |

(Continued)

FOREIGN PATENT DOCUMENTS

| | | |
|---|---|---|
| EP | 2126398 | 12/2009 |
| EP | 2824353 | 1/2015 |
| JP | 02286926 A | * 11/1990 |

OTHER PUBLICATIONS

Notice of Allowance dated Apr. 26, 2016 in U.S. Appl. No. 14/610,092.

(Continued)

*Primary Examiner* — Thomas J Williams
(74) *Attorney, Agent, or Firm* — Snell & Wilmer L.L.P.

(57) ABSTRACT

Friction disks, such as rotors and stators, including floating wear liners are disclosed. The friction disks may include a core and a floating wear liner configured to contact a contact surface of the core. The cores may include a retention ring that is substantially concentric with the core and extends axially beyond the plane of the contact surface. The retention ring may radially constrain the floating wear liner in a position aligned with the contact surface to provide frictional contact with the core during braking.

16 Claims, 6 Drawing Sheets

(56) References Cited

U.S. PATENT DOCUMENTS

| | | |
|---|---|---|
| 5,779,006 A | 7/1998 | Hyde et al. |
| 6,006,885 A | 12/1999 | Borgeaud et al. |
| 6,193,024 B1 | 2/2001 | Heppes et al. |
| 6,702,068 B1 | 3/2004 | Riebe |
| 9,169,884 B2 | 10/2015 | Hoots et al. |
| 9,366,302 B1 | 6/2016 | Kirkpatrick |
| 2015/0001017 A1* | 1/2015 | Kirkpatrick ............ F16D 65/12 188/218 XL |

OTHER PUBLICATIONS

Extended European Search Report dated Jun. 14, 2016 in European Application No. 16152897.1.
Extended European Search Report dated Jun. 14, 2016 in European Application No. 16153489.6.

* cited by examiner

FRICTION DISKS WITH FLOATING WEAR LININGS

FIELD

The present disclosure relates to aircraft brake systems. In particular, the disclosure relates to a brake disk assembly of an aircraft brake system.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. During high speed landings and rejected takeoffs ("RTOs"), the amount of heat and force generated can be enough to destroy friction disks made of formerly commonly used materials, such as steel. Carbon composite materials are better suited for high temperature use and are now the standard for friction disks in aircraft brake assemblies. However, carbon composite disks can be expensive to manufacture, especially ones having the thickness preferable for use on an aircraft. Replaceable wear liners bonded to a reusable core may delaminate from the core due to the high shear force during braking in combination with high braking temperatures.

SUMMARY

In various embodiments, an aircraft brake system may comprise a plurality of friction disks. A friction disk may comprise a friction disk core and a floating wear liner. A friction disk core may comprise a contact surface defining a contact surface plane. A friction disk core may also comprise a retention ring extending axially relative to the contact surface plane. The retention ring may radially constrain a floating wear liner in position that is substantially concentric with the friction disk core. The floating wear liner may be in rotatable contact with the friction disk core.

In various embodiments, a multi-disk brake system is disclosed. A brake system may comprise a plurality of adjacent stator-rotor pairs. Each adjacent stator-rotor pair may comprise a stator core and a rotor core. A floating wear liner may be disposed between the rotor core and the stator core in at least one of the plurality of adjacent stator-rotor pairs. At least one of the stator cores and the rotor cores may comprise a retention ring. The floating wear liner may be radially constrained within the multi-disk brake system by the retention ring located on one of the rotor cores or stator cores. The floating wear liner may be able to move axially and rotationally with respect to the stator core or the rotor core comprising the retention ring. The floating wear liner may distribute friction between two wear surfaces in response to aircraft braking, and may produce a reduced relative rotational velocity at each of the two wear surfaces relative to a rotational velocity of a fixed rotating component.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Friction disks, including rotors, stators, and floating wear liners, are disclosed. The friction disks may include a friction disk core with a contact surface and a floating wear liner configured to contact the contact surface. The core may comprise a retention ring concentric with the core and extending axially relative to a plane of the contact surface. The retention ring may radially constrain the floating wear liner in a brake system in a position substantially concentric with a friction disk core suitable to provide frictional contact with the core and/or an adjacent friction disk during braking.

Figure 1:
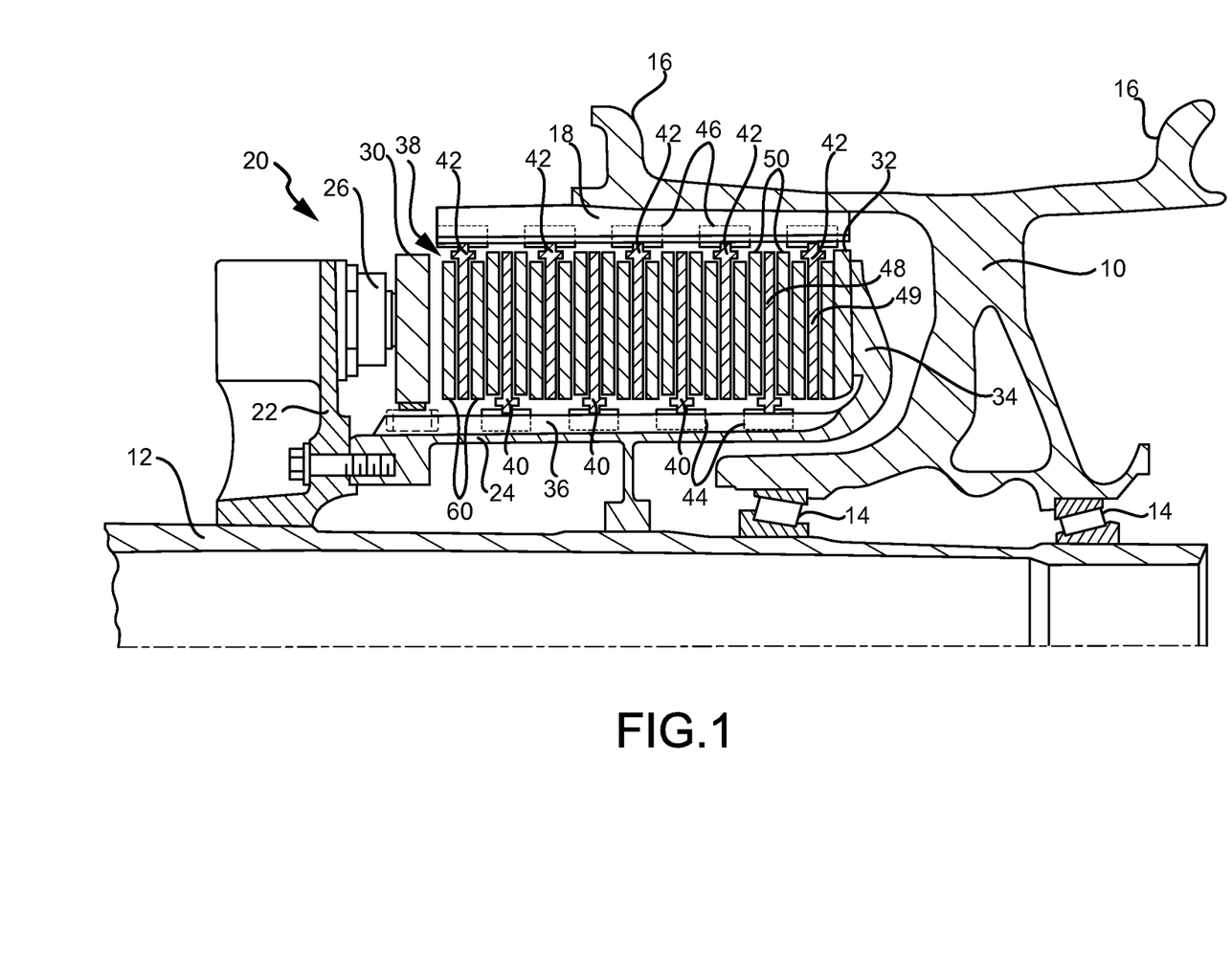
FIG. 1 illustrates, in accordance with various embodiments, a multi-disk brake system.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 is an elongated annular structure that includes reaction plate 34 and a series of axially extending stator splines 36 (one shown). Reaction plate 34 and stator splines 36 may be integral with torque tube 24 as shown in FIG. 1, or attached as separate components.

Multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and floating stator wear liners 50. Rotors 42 may comprise a rotor core 49 and floating rotor wear liners 60. Each friction disk 38 includes an attachment structure. In the embodiment of FIG. 1, each of four stators 40 includes a plurality of stator lugs 44 at circumferentially spaced positions around stator 40 as an attachment structure. Similarly, each of five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 is mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42 with rotor cores 49. Pistons 26 may be powered electrically, hydraulically, or pneumatically.

Figure 2:
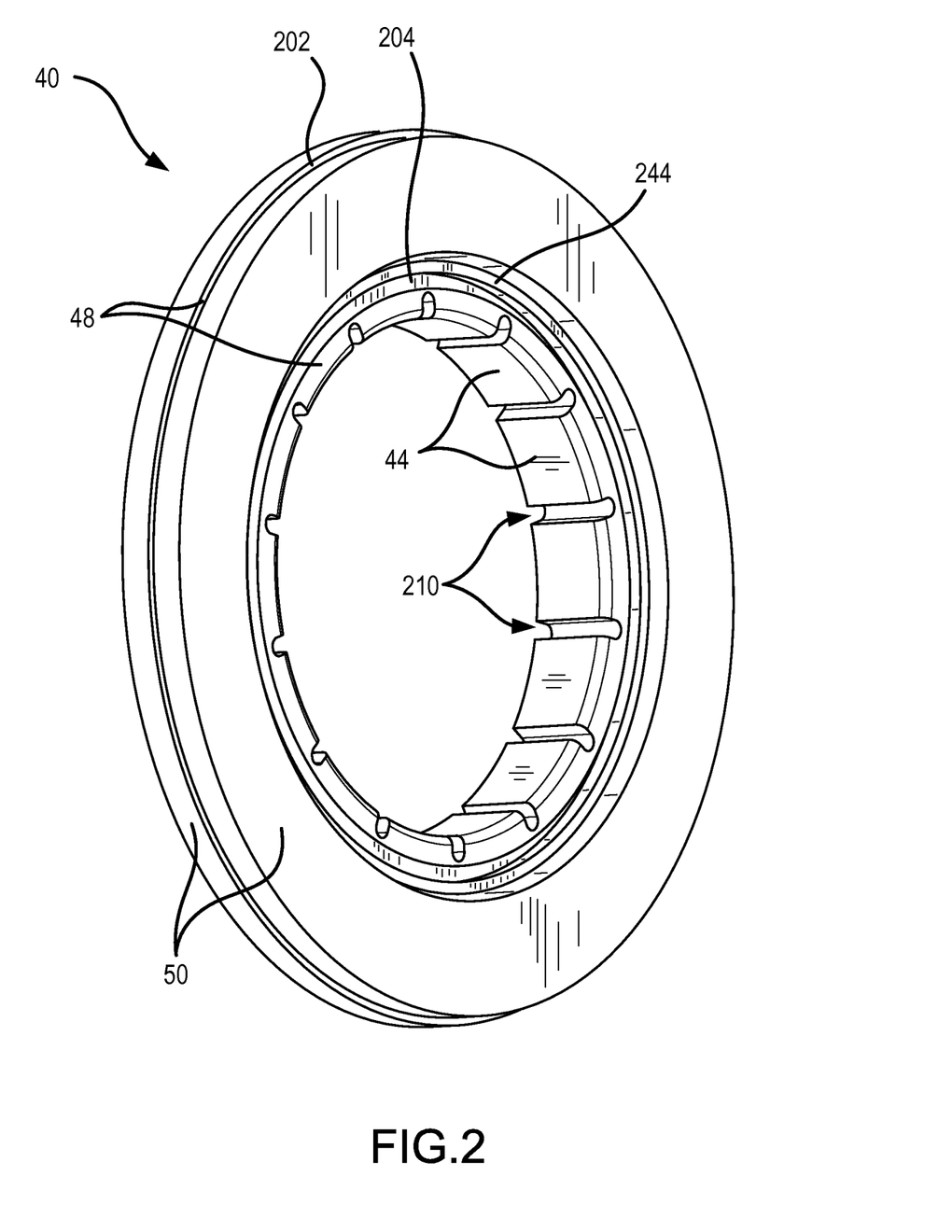
FIG. 2 illustrates, in accordance with various embodiments, a perspective view of a stator having a floating wear liner.

Referring to FIG. 2, a stator 40 is illustrated according to various embodiments. Stator 40 may comprise a stator core 48 and floating stator wear liners 50. Stator core 48 and floating stator wear liners 50 may comprise different materials. For example, in various embodiments, stator core 48 may comprise a first material such as steel, and floating stator wear liners 50 may comprise a second material such as a carbon composite material. However, in various embodiments, stator core 48 and stator wear liners 50 may comprise the same material, such as a carbon composite material. In various embodiments, the material of stator core 48 may be selected for its structural properties, thermal conductivity, heat capacity, and/or oxidation resistance properties. For example, stator core 48 may comprise silicon carbide or titanium. In various embodiments, a material of floating stator wear liners 50 may be selected for its wear resistance and/or frictional properties. Thus, stator 40 may contain the structural advantages of stator core 48 and the frictional advantages of floating stator wear liners 50.

Stator core 48 may comprise spine 202 and inner core 204. Inner core 204 may comprise stator lugs 44. Inner core 204 may further comprise stator gaps 210 between an inner portion of stator lugs 44. Stator gaps 210 may be located to align with stator splines 36. The engagement between the stator splines 36 and stator lugs 44 prevents stator core 48 from rotating in response to a torque being applied to stator 40 during braking. Stator core 48 may further comprise stator retention ring 244 located at a radially outer portion of inner core 204. Stator retention ring 244 may comprise an annular feature extending axially from the stator core 48 relative to a plane of a contact surface of the stator core, as described in greater detail below. In various embodiments, stator retention ring 244 may be substantially concentric with stator core 48.

Figure 3:
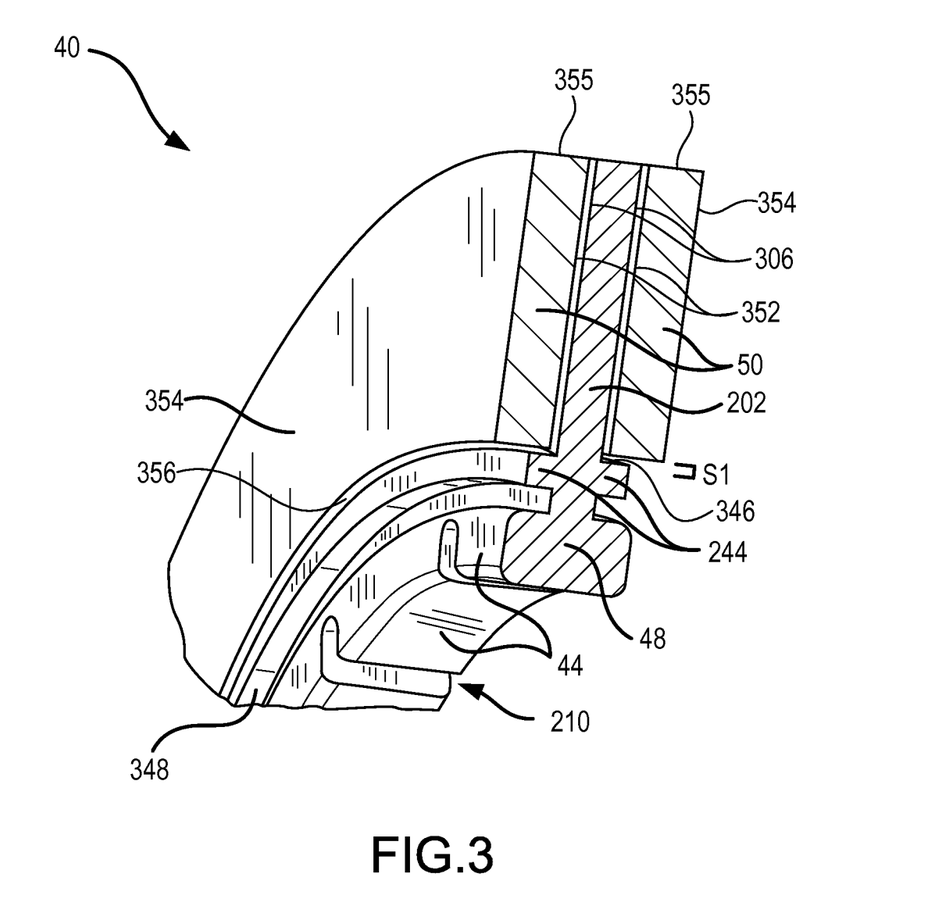
FIG. 3 illustrates, in accordance with various embodiments, a cutaway view of a stator having a floating wear liner.

Referring to FIG. 3, a cutaway view of stator 40 is illustrated according to various embodiments. Stator 40 may comprise stator core 48, stator lugs 44, stator gaps 210, floating stator wear liners 50, and stator retention ring 244. Stator core 48 may have stator retention rings 244 on both axial sides of the stator core 48. Stator retention rings 244 may be integral to stator core 48 and may project from stator core 48 in an axial direction relative to a plane defined by stator contact surface 306. Described differently, each stator contact surface 306 comprises a contact surface defining a contact surface plane. In various embodiments, each stator retention ring 244 may comprise a substantially rectangular cross section and have a radially outer wall 346 that is substantially parallel to the axis of stator core 48. Outer wall 346 may define a stator retention ring outer diameter. A radially inner wall 348 of stator retention ring 244 may define the stator retention ring as a feature of inner core 204 distinct from stator lugs 44. However, other stator retention ring cross-sectional profiles are possible and a stator retention ring and stator lugs may not comprise distinct structural features of inner core 204. For example, in various embodiments, stator lugs 44 and stator retention rings 244 may be integral, with inner core 204 comprising a lug portion defined at an outer radial edge by outer wall 346.

In various embodiments, each retention ring 244 of a stator may have an identical or substantially similar configuration. For example, stator core 48 may be bilaterally symmetrical in a transverse cross-section, as illustrated, with retention rings 244 having substantially similar cross sections and stator retention ring outer diameters. This may enable interchangeable use of floating stator wear liners 50 on either side of stator core 48.

In various embodiments, floating stator wear liner 50 may comprise an annular ring configured to contact stator core 48. Each floating stator wear liner 50 may have a first wear surface 352 and a second wear surface 354 opposite the first wear surface. Wear surfaces 352 and 354 may be configured to contact stator contact surface 306 and/or an adjacent friction component of a brake system. In various embodiments, floating stator wear liner 50 may be reversible, and either first wear surface 352 or second wear surface 354 may be oriented toward stator core 48 and stator contact surface 306. In various embodiments, floating stator wear liners 50 may comprise a substantially uniform thickness in an axial dimension.

Each floating stator wear liner 50 may further comprise axial walls extending between wear surfaces 352 and 354, with an exterior axial wall 355 defining an outside diameter and an interior axial wall 356 defining an interior diameter. The interior axial wall 356 defining the interior diameter may be configured to receive outer wall 346 of stator retention ring 244, thereby permitting floating stator wear liner 50 to be fitted about outer wall 346 and located adjacent to stator core 48 with first wear surface 352 in contact with stator contact surface 306. Stated differently, the configuration of each stator wear liner 50 may be complementary to the configuration of stator core 48, with the profile and interior diameter of interior axial wall 356 being complementary to the profile and stator retention ring outer diameter of stator retention ring 244, such that stator wear liner 50 may receive stator retention ring 244 within the interior diameter defined by interior axial wall 356. In various embodiments, the uniform axial thickness, parallel wear surfaces, and interior and outside diameter specifications provide for straightforward manufacturing and/or machining of floating wear liners.

In various embodiments, a space S1 may be defined between outer wall 346 of retention ring 244 and interior axial wall 356 of floating stator wear liner 50 when floating stator wear liner 50 is fitted about outer wall 346 and positioned substantially concentrically with stator core 48. Space S1 may be sufficient to permit floating stator wear liner 50 to rotate with respect to interior axial wall 356 throughout the temperature range experienced by the braking system in operation, including high braking temperatures that may cause thermal expansion of stator core 48. Space S1 may also be suitable to reduce radial movement of floating stator wear liner 50 relative to stator core 48 during aircraft operation and under braking forces and to radially constrain floating stator wear liner 50 in a suitable position to contribute to braking performance when the braking system is engaged. For example, in various embodiments, space S1 may be between about 0.005 inches (~0.127 mm) and about 0.01 inches (~0.254 mm). In various other embodiments, floating stator wear liner 50 may be press fit about wall 346 and space S1 may be between, for example, about 0.0001 inches (~0.00254 mm) and about 0.005 inches (~0.127 mm) (i.e., stator retention ring outer wall 346 may be oversize with respect to interior axial wall 356 of floating stator wear liner 50, producing a press fit on initial installation of floating stator wear liner 50). In operation, wear may occur to the surfaces of outer wall 346 of retention ring 244 and interior axial wall 356 of floating stator wear liner 50, and space S1 may increase over the service life of the friction disk components. A significant increase of space S1 beyond may lead to reduced brake system performance, for example, due to vibration caused by increased radial movement of floating stator wear liner 50.

As illustrated, floating stator wear liners 50 may be located adjacent to opposite sides of spine 202. In various embodiments, floating stator wear liners 50 may not be coupled to stator core 48, for example, by bonding or by mechanical fastening such as riveting. Rather, in various embodiments, floating stator wear liners 50 may be free to move rotationally and/or axially while adjacent to spine 202 of stator core 48, and may be brought into contact with spine 202 by actuation of the braking system. Floating stator wear liners 50 may be radially constrained by retention ring 244 as described above. Floating stator wear liners 50 may be axially constrained in proximity to spine 202 by adjacent components such as rotors 42 when the brake system is in a running clearance position. Axial constraint of a floating wear liner 50 may be achieved by virtue of the axial distance that outer wall 346 extends from the plane defined by stator contact surface 306 being equal to or greater than the running clearance position distance of the brake system. For example, if the running clearance position distance of a brake system is 0.120 inches (3.048 mm), the axial length of outer walls 346 would need to be at least 0.120 inches (3.048 mm) to maintain axial constraint of floating stator wear liners 50 with the brake system in a running clearance position.

In the illustrated embodiment, both wear liners of stator 40 are floating stator wear liners 50 and are not coupled to stator core 48; however, in various other embodiments, one or more of the wear liners in a stator may not be a floating stator wear liner 50 and instead may be coupled to a contact surface of spine 202. In various embodiments, floating stator wear liners 50 may be replaceable, such that after floating stator wear liners 50 have been worn below a suitable operational thickness, floating stator wear liners 50 may be removed from stator 40 and replaced by new or remanufactured wear liners. Use of floating stator wear liners 50 may provide various advantages during brake system maintenance. For example, floating stator wear liners 50 may be removed and replaced without a need to remove and resurface or machine stator core 48 for continued operation after wear liner replacement.

During aircraft braking, a torque may be applied to floating stator wear liners 50. For example, and with reference now also to FIG. 1, a torque may be applied by an adjacent rotatable brake system component, such as rotor 42 with a rotor core 49, during braking of a moving aircraft. The torque may cause a shear force that, in the absence of a counteracting force, acts to rotate floating stator wear liners 50 relative to stator core 48. Contact between stator contact surface 306 and first wear surface 352 may counteract an applied torque. Because each floating stator wear liner 50 may rotate with respect to outer wall 346 and stator core 48, a frictional force between stator contact surface 306 and first wear surface 352 may be produced in response to an applied torque with rotation of floating stator wear liner 50 and contact between stator contact surface 306 and first wear surface 352. The frictional resistance to rotation produced by contact between stator contact surface 306 and first wear surface 352 may also limit rotation of each floating stator wear liner 50 relative to rotation of an adjacent rotor 42, and may thereby produce a frictional force between second wear surface 354 and the adjacent rotor 42.

Rotation of floating stator wear liner 50 relative to stator core 48 and an adjacent rotor 42 during aircraft braking distributes friction between two surfaces of floating stator wear liner 50, rather than a single surface of a fixed stator wear liner. A reduced relative rotational velocity is produced for each friction interface of floating stator wear liner 50 compared to the single friction interface of a fixed wear liner. Distribution of frictional forces amongst a higher number of friction interfaces may also improve heat distribution to the heat sink of the brake system. The increased number of friction interfaces and improved heat distribution may permit use of braking systems with a decreased number of rotors and stators. Likewise, the increased distribution of frictional forces and improved heat distribution may improve wear rates of wear liners. Rotation of floating stator wear liner 50 may also produce a vibration damping benefit due to reduced torque oscillations that might be induced by a sudden high friction event that may occur at a friction interface in a multi-disk brake system during aircraft braking. For example, a sudden high friction event occurring at a friction interface between a rotor wear liner and a floating stator wear liner may result in rotation of the floating stator wear liner with respect to the stator core, rather than causing the torque force to accumulate in the braking system in response to the high friction event and overcome the high friction even in a sudden manner, producing a torque oscillation that may lead to a vibration transmitted through the braking system.

Figure 4:
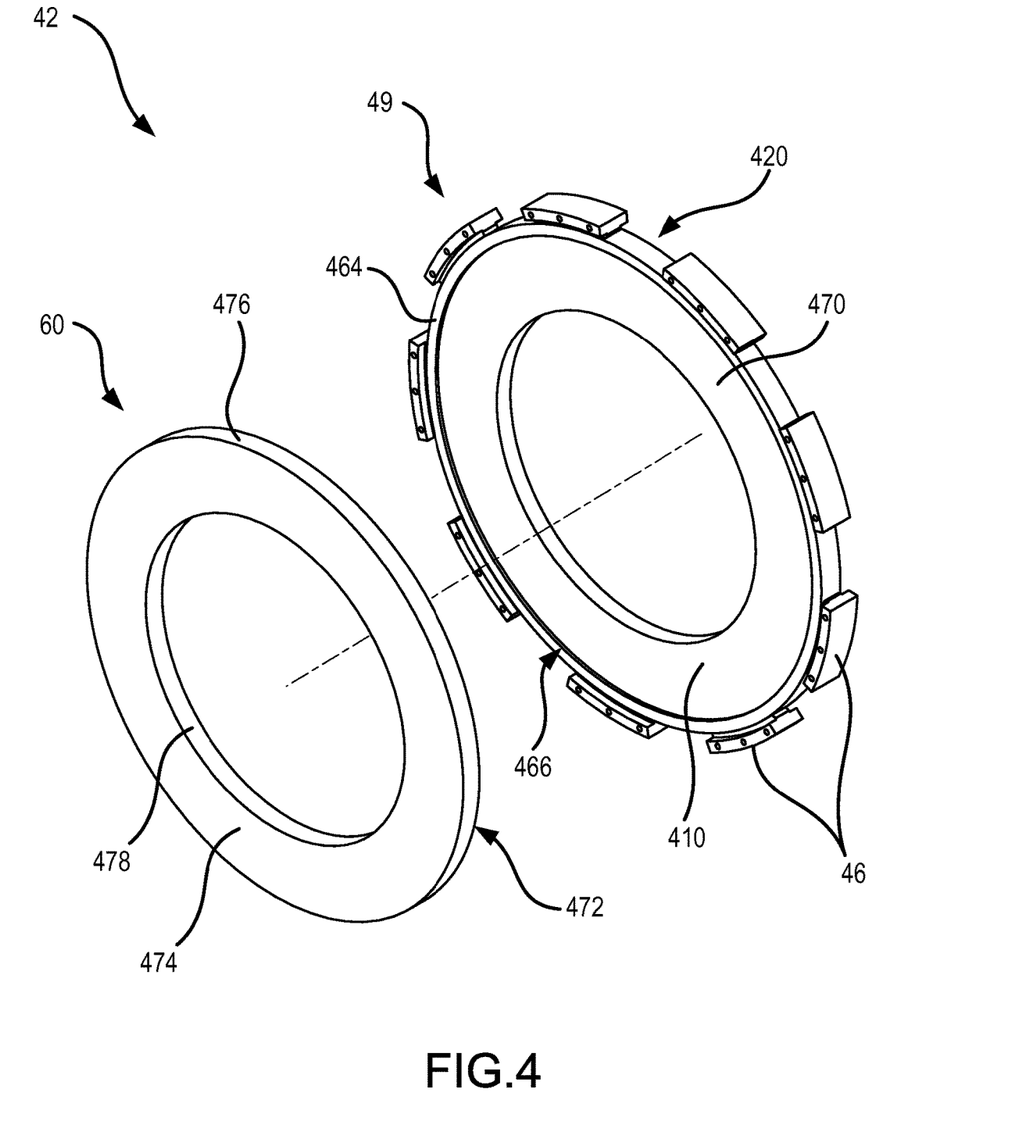
FIG. 4 illustrates, in accordance with various embodiments, an exploded view of a rotor having a floating wear liner.

Referring to FIG. 4, an exploded view of a rotor 42 is illustrated according to various embodiments. Rotor 42 may comprise rotor core 49 and rotor wear liners 60 (one shown). Similar to stators 40 described above, rotor core 49 and floating rotor wear liners 60 of rotor 42 may comprise different materials. For example, in various embodiments, rotor core 49 may comprise a first material such as steel, and floating rotor wear liners 60 may comprise a second material such as a carbon composite material. However, in various embodiments, rotor core 49 and rotor wear liners 60 may comprise the same material, such as a carbon composite material. In various embodiments, the material of rotor core 49 may be selected for its structural properties, thermal conductivity, heat capacity, and/or oxidation resistance properties. For example, rotor core 49 may comprise silicon carbide or titanium. A material of floating rotor wear liners 60 may be selected for its frictional properties. For example, floating rotor wear liners 60 may comprise a carbon composite material. Thus, rotor 42 may contain the structural advantages of rotor core 49, and the frictional advantages of floating rotor wear liners 60.

Rotor core 49 may comprise rotor spine 410 and rotor lugs 46. Rotor core 49 may engage rotor splines 18 in rotor gaps 420 formed between rotor lugs 46. Thus, rotor 42 may be rotatable by virtue of the engagement between rotor lugs 46 of rotor core 49 and rotor splines 18 of wheel 10. Rotor core 49 may comprise rotor retention ring 464 located radially inward from the rotor lugs 46. In various embodiments, rotor retention ring 464 may comprise an annular feature that may be substantially concentric with rotor core 49 and may extend axially from the rotor core 49 relative to a plane defined by contact surface 470 (only one surface visible) of the rotor core. Described differently, each rotor contact surface 470 comprises a contact surface defining a contact surface plane. In various embodiments, rotor retention ring 464 may comprise a substantially rectangular cross section and have a radially inner wall 466 that is substantially perpendicular to the plane defined by rotor contact surface 470. Rotor retention ring 464 may be integral to rotor core 49, as shown, or a rotor retention ring may be a separate component coupled to rotor core 49. Inner wall 466 may define a rotor retention ring inner diameter. A radially outer wall of rotor retention ring 464 may define the rotor retention ring as a feature of rotor core 49 distinct from rotor lugs 46. However, other rotor retention ring cross-sectional profiles are possible and a rotor retention ring and rotor lugs may not comprise distinct structural features of rotor core 49. In various embodiments, each retention ring 464 of a rotor may have an identical or substantially similar configuration. For example, rotor core 49 may be bilaterally symmetrical in a transverse cross-section, with retention rings 464 having substantially similar cross sections and rotor retention ring inner diameters. This may enable interchangeable use of floating rotor wear liners 60 on either side of rotor core 49.

In various embodiments, floating rotor wear liner 60 may comprise an annular ring configured to contact rotor core 49. Each floating rotor wear liner 60 may have a first wear surface 472 and a second wear surface 474 opposite the first wear surface. Wear surfaces 472 and 474 may be configured to contact rotor contact surface 470 or an adjacent friction component of a brake system. In various embodiments, floating rotor wear liner 60 may be reversible, and either first wear surface 472 or second wear surface 474 may be oriented toward rotor core 49. In various embodiments, floating rotor wear liners 60 may comprise a substantially uniform thickness in an axial dimension. Each floating rotor wear liner 60 may further comprise walls extending axially between wear surfaces 472 and 474, with an exterior axial wall 476 defining an outside diameter and an interior axial wall 478 defining an interior diameter. Exterior axial wall 476 defining the outside diameter may be configured to be received by inner wall 466 of rotor retention ring 464, thereby permitting floating rotor wear liner 60 to be fit within inner wall 466 and located adjacent to rotor core 49 with first wear surface 474 in contact with rotor contact surface 470. Stated differently, the configuration of each rotor wear liner 60 may be complementary to the configuration of stator core 49, with the profile and outside diameter of exterior axial wall 476 being complementary to the profile and rotor retention ring inner diameter of rotor retention ring 464, such that rotor core 49 may receive rotor wear liner 60 within the rotor retention ring inner diameter defined by inner wall 466.

Figure 5:
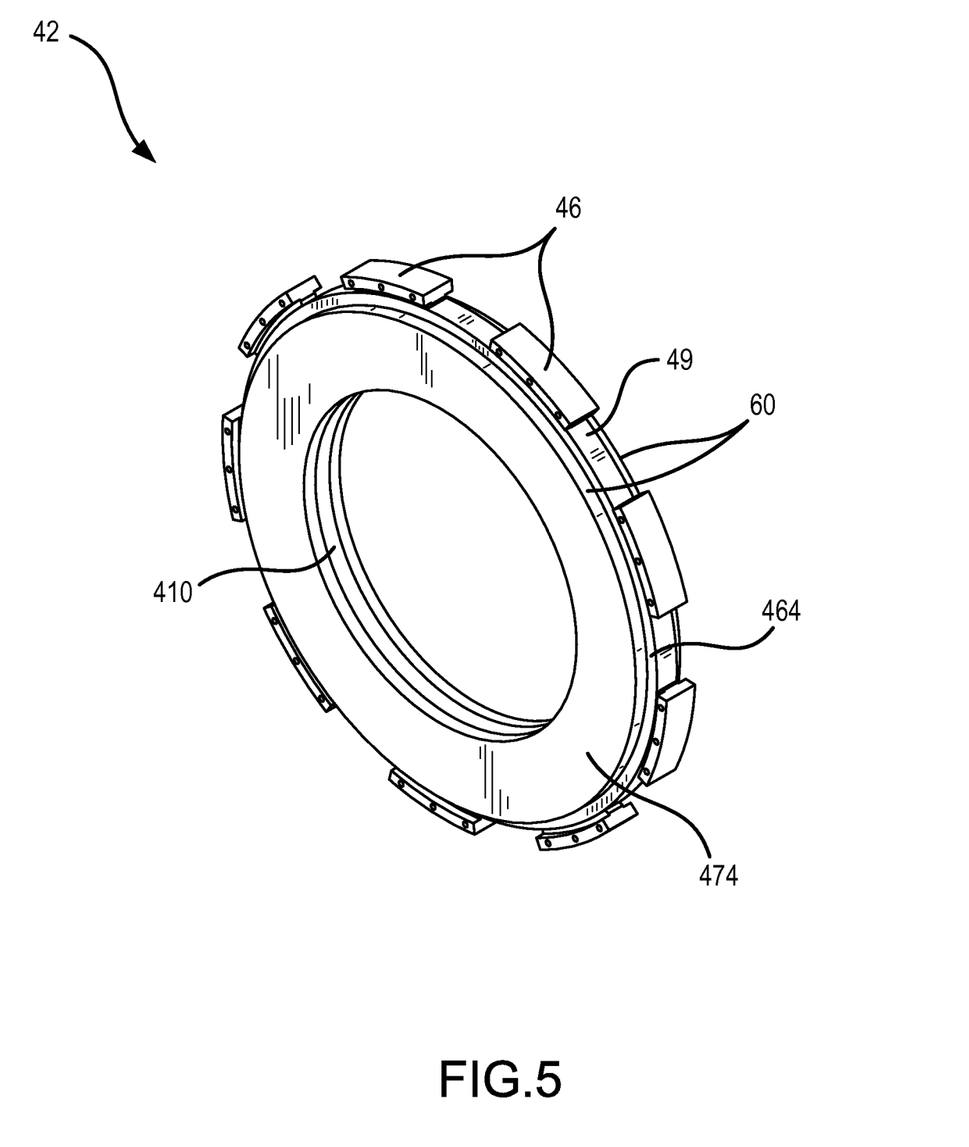
FIG. 5 illustrates, in accordance with various embodiments, a perspective view of an assembled rotor having a floating wear liner.

Referring to now to FIG. 5, an assembled rotor 42 is illustrated according to various embodiments. Rotor 42 comprises rotor wear liners 60 located adjacent to each side of rotor spine 410 of rotor core 49. With reference also to FIG. 4, floating rotor wear liner 60 may be fit within inner wall 466 of rotor retention ring 464. Floating rotor wear liners 60 may not be coupled to rotor core 49, for example, by bonding or by mechanical fastening. In various embodiments, floating rotor wear liners 60 may be free to move rotationally and/or axially while adjacent to spine 410 of rotor core 49, and may be brought into contact with spine 410 by actuation of the braking system. However, in various embodiments, one or more of the wear liners in a rotor of a multi-disk braking system may not be a floating rotor wear liner 60 and instead may be coupled to a surface of spine 410, as described further elsewhere herein.

Similar to stator 40, floating rotor wear liner 60 may be configured with an outside diameter suitable to provide a space between exterior axial wall 476 and inner wall 466 suitable to permit floating rotor wear liner 60 to rotate within inner wall 466 during operation of the braking system while reducing or minimizing radial movement and radially constraining floating rotor wear liner 60 in a suitable position to contribute to braking performance when the braking system is actuated. Similar to stator 40, floating rotor wear liners 60 may move axially and rotationally in an assembled brake system. Floating rotor wear liners 60 may be axially constrained by adjacent components such as stators 40 when the brake system is in a running clearance position by virtue of the length of inner wall 466 being equal to or greater than the running clearance position distance of the brake system.

In various embodiments, first wear surface 472 of floating rotor wear liner 60 located opposite rotor wear surface 470 of rotor core 49 may contact rotor wear surface 470 during braking. A torque applied to rotor core 49 may cause a shear force that, in the absence of a counteracting force, acts to rotate floating rotor wear liner 60. Rotation of floating wear liner 60 may be counteracted by contact (indirect or direct contact) with a non-rotatable brake system component such as stator 40, as described above. For example, floating rotor wear liner 60 may contact floating stator wear liner 50, which may exert a counteracting force by virtue of contact with (i.e., a static frictional force) stator core 48. The counteracting static frictional force may produce a dynamic frictional force between second wear surface 474 of floating rotor wear liner 60 and wear surface 354 of floating stator wear liner 50. The frictional resistance to rotation of floating rotor wear liner 60 produced by floating stator wear liner 50 may limit rotation of floating rotor wear liner 60 relative to rotor core 49, thereby producing a dynamic frictional force between first wear surface 472 and contact surface 470. In this manner, rotation of floating rotor wear liner 60 relative to rotor core 49 and an adjacent stator 40 during aircraft braking distributes friction between two surfaces of floating rotor wear liner 60, rather than a single surface of a fixed stator wear liner, and results in a reduced relative rotational velocity at each friction interface of floating rotor wear liner 60 compared to the single friction interface of a fixed wear liner.

Figure 6:
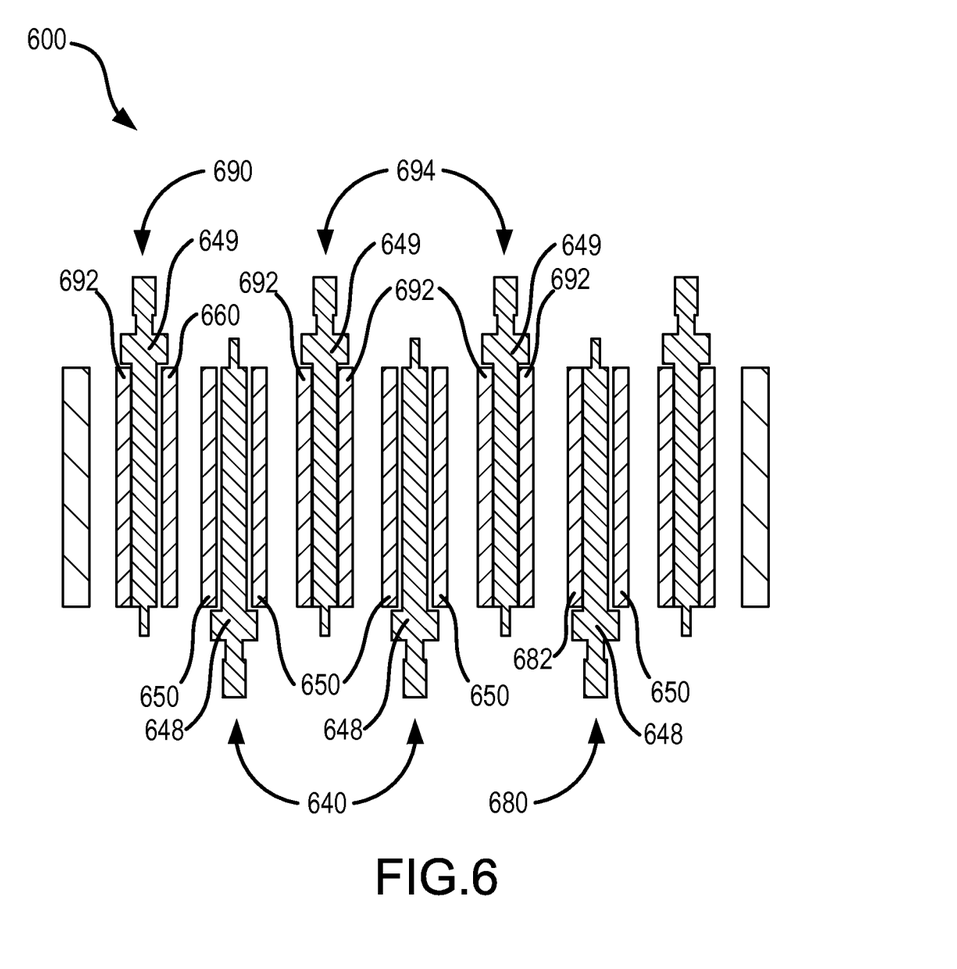
FIG. 6 illustrates, in accordance with various embodiments, rotors and stators with fixed and floating wear liners in a multi-disk brake system.

In various embodiments, a multi-disk brake system may comprise a plurality of adjacent stator-rotor pairs. Each of the adjacent stator-rotor pairs may comprise a stator with a stator core and an adjacent rotor with a rotor core. An adjacent stator-rotor pair may comprise one or more floating wear liners disposed between the rotor core and the stator core of the stator-rotor pair. In various embodiments, the rotor and stator may each comprise floating wear liners radially constrained by retention rings on each of the rotor core and the stator core, as described above with reference to FIGS. 1-5. In various embodiments, a multi-disk brake system may comprise an adjacent stator-rotor pair in which at least one of the stator or the rotor does not comprise a floating wear liner, but instead comprises a wear liner coupled to one of the stator core or the rotor core. For example, and as illustrated in FIG. 6, a multi-disk braking system 600 may comprise stator-rotor pairs that include a hybrid stator 680 with a floating stator wear liner 650 and a fixed stator wear liner 682 that is coupled to stator core 648. Likewise, a stator-rotor pair can include a hybrid rotor 690 with a floating rotor wear liner 660 and a fixed rotor wear liner 692 coupled to the rotor core 649. A floating wear liner may be radially constrained by a retention ring of a rotor core or stator core comprising the floating wear liner, as described in detail above. A rotor or stator comprising a fixed wear liner may or may not include a retention ring on the side of the rotor core or stator core comprising the fixed wear liner.

In various embodiments, a multi-disk brake system 600 may comprise stator-rotor pairs including a rotor 694 with fixed rotor wear liners 692 coupled to both sides of rotor core 649 adjacent (i.e., paired with) a stator 640 with floating stator wear liners on each side of stator core 648, thereby forming an adjacent stator-rotor pairs comprising stator 640 and rotor 694. A plurality of wear liners (i.e., fixed rotor wear liner 692 and floating stator wear liner 650) are thus disposed between stator core 648 and rotor core 649 of the stator-rotor pair, with one of the plurality of wear liners comprising a floating wear liner. Although two such stator-rotor pairs are illustrated in FIG. 6, in various embodiments, a multi-disk brake system may comprise rotors with fixed rotor wear liners such as rotors 694 and stators with floating stator wear liners such as stators 640. Multi-disk brake systems comprising stators and rotors and stator-rotor pairs having any possible logical combination of fixed and floating wear liners are within the scope of the present invention.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
    a friction disk core comprising:
        a spine comprising a first contact surface of the spine that defines a first contact surface plane; and
        a first retention ring comprising an annular feature, the first retention ring disposed substantially concentrically with the friction disk core and extending axially relative to the first contact surface plane, wherein the first retention ring has a first retention ring wall that is substantially parallel with a friction disk core axis; and
    a first floating wear liner rotatable about the friction disk core axis with respect to the friction disk core, the first floating wear liner comprising:

a first wear surface configured to contact the first contact surface;
a second wear surface opposite the first wear surface;
an interior axial wall defining an interior diameter;
and an exterior axial wall defining an outside diameter;
wherein the interior axial wall and the exterior axial wall extend between the first wear surface and the second wear surface, and wherein the interior axial wall is radially spaced a distance apart from and has a configuration complementary to the first retention ring wall.

2. The friction disk of claim 1, wherein the first retention ring has a substantially rectangular cross section.

3. The friction disk of claim 1, wherein the friction disk core comprises a first material, the first floating wear liner comprises a second material, and wherein the first material is different than the second material.

4. The friction disk of claim 1, wherein the friction disk is a stator, wherein the first retention ring is a stator retention ring, wherein the first retention ring wall is an outer wall of the stator retention ring, and wherein the interior axial wall of the first floating wear liner is configured to receive the outer wall of the stator retention ring.

5. The friction disk of claim 1, wherein the friction disk is a rotor, wherein the first retention ring is a rotor retention ring, wherein the first retention ring wall is an inner wall of the rotor retention ring, and wherein the inner wall of the rotor retention ring is configured to receive the exterior axial wall of the first floating wear liner.

6. The friction disk of claim 1, further comprising:
a second floating wear liner, and
wherein the friction disk core further comprises:
a second contact surface of the spine that defines a second contact surface plane; and
a second retention ring comprising an annular feature, the second retention ring disposed substantially concentrically with the friction disk core and extending axially relative the second contact surface plane, wherein the second retention ring has a second retention ring wall that is substantially parallel with the friction disk core axis.

7. The friction disk of claim 6, wherein the first retention ring and the second retention ring have a substantially similar configuration, and wherein the first wear liner and the second wear liner are interchangeable.

8. The friction disk of claim 1, wherein the distance is between about 0.005 inches and about 0.01 inches.

9. A multi-disk brake system comprising:
a plurality of adjacent stator-rotor pairs, each one of the adjacent stator-rotor pairs comprising a stator core and a rotor core; and
a floating wear liner disposed between the rotor core and the stator core in at least one of the plurality of adjacent stator-rotor pairs, wherein the floating wear liner is rotatable about a core axis of the stator core and the rotor core;
wherein at least one of the stator cores and the rotor cores comprises a retention ring; and
wherein the floating wear liner is radially spaced a distance apart from the retention ring and is radially constrained within the multi-disk brake system by the retention ring.

10. The multi-disk brake system of claim 9, wherein the system comprises a plurality of wear liners disposed between one of the plurality of adjacent stator-rotor pairs, and wherein one of the plurality of wear liners is the floating wear liner.

11. The multi-disk brake system of claim 10, wherein the floating wear liner can move axially and rotationally with respect to the at least one of the stator cores and the rotor cores comprising the retention ring.

12. The multi-disk brake system of claim 11, wherein the floating wear liner distributes friction between two wear surfaces of the floating wear liner in response to aircraft braking.

13. The multi-disk brake system of claim 11, wherein the floating wear liner produces a reduced relative rotational velocity at each of two wear surfaces of the floating wear liner in response to aircraft braking relative to a rotational velocity of a fixed rotating component.

14. The multi-disk brake system of claim 10, wherein the plurality of wear liners includes a plurality of the floating wear liners.

15. The multi-disk brake system of claim 14, wherein the system comprises a plurality of stators and a plurality of rotors, each of the plurality of stators comprising one of the plurality of the floating wear liners, and each of the plurality of rotors comprising one of the plurality of wear liners fixed to the rotor.

16. The multi-disk brake system of claim 9, wherein the distance is between about 0.005 inches and about 0.01 inches.

* * * * *